Nov. 22, 1955     C. H. O. BERG     2,724,619
CONVEYANCE OF GRANULAR SOLIDS
Filed April 2, 1953
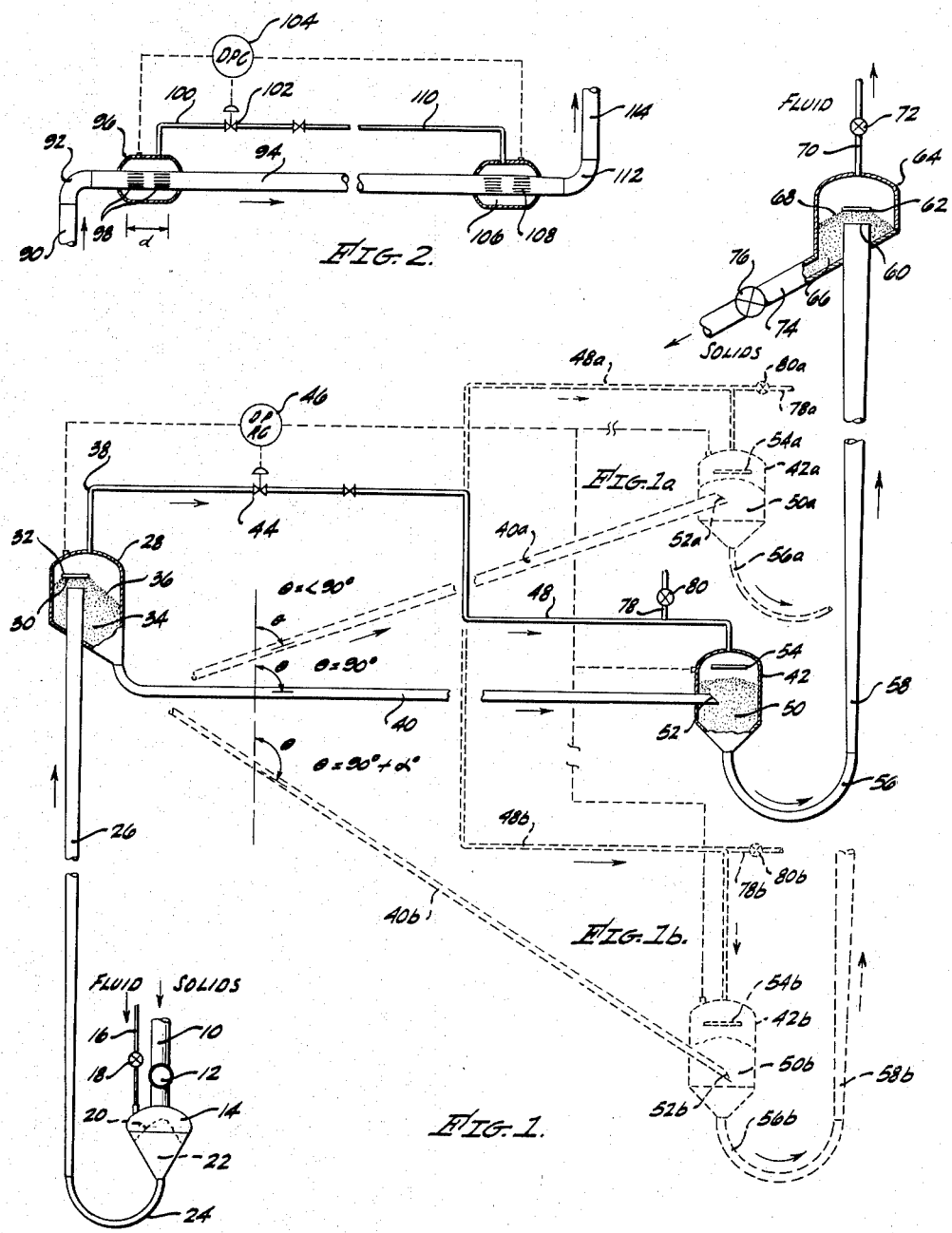
INVENTOR.
CLYDE H. O. BERG,
BY
AGENT

United States Patent Office 2,724,619
Patented Nov. 22, 1955

2,724,619

CONVEYANCE OF GRANULAR SOLIDS

Clyde H. O. Berg, Long Beach, Calif., assignor to Union Oil Company of California, Los Angeles, Calif., a corporation of California Application April 2, 1953, Serial No. 346,407

20 Claims. (Cl. 302—53)

This invention relates to the conveyance and transportation of granular solid materials and in particular relates to an improved process and apparatus for the conveyance of such granular solids through elongated conduits by means of a concurrently flowing conveyance fluid and wherein the granular solids are maintained entirely throughout the conveyance conduit as a dense continuous mass of compact solids. The invention is specifically directed to such a compact solids conveyance system in which the solids are transported through a multidirectional or nonlinear conveyance zone such as one having a plurality of linear sections of differing slope and in which fluid is withdrawn or injected at the points where the slope changes whereby a minimum quantity of conveyance fluid and a minimum over-all pressure drop is obtained and a maximum quantity of solids is conveyed per unit of energy consumed by the system.

The movement of granular solids in appreciably large quantities presents a technical problem in many industrial operations such as the movement of cracking catalysts in the well-known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized to avoid an economic disadvantage. Such conditions are pronounced in the transportation of expensive granular catalysts which are required to be circulated at rates of as high as 800 to 1000 tons per hour as, for example, in catalytic cracking processes employing catalyst-to-oil ratios as high as about 10 to 15 or higher.

Conventionally, granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalysts at a rate of about 150 tons per hour are approximately 4 feet in length, 1 foot in width, and 1.5 feet deep. Furthermore, the maintenance of the necessary driving mechanism at temperatures of the order of those in the cracking processes is difficult and expensive. Furthermore, the quantity of granular solids lost by attrition in loading and unloading the buckets is frequently excessive.

The conventional pneumatic conveyors also employed for solids transportation, involve the suspension or fluidization of the granular solids to be conveyed in a fluid and the solids conveyance is effected by passing the suspension of solids through an elongated conduit. This type of conveyor, generally referred to as a suspension or gas-lift conveyor, has inherent disadvantages of excessive solids attrition due to the impact of the suspended particles with each other and with the internal surfaces of the conveyance conduit particularly at points where the flow direction changes. At such flow direction change, the momentum of the granular solids forces them against the walls of the conduit causing a second disadvantage involving erosion of the conduit itself. In the past this disadvantage has been particularly pronounced in the well-known fluid catalyst cracking of hydrocarbons and other processes using "fluidized" solids in which elaborate precautions have been taken to prevent such erosion. This erosion is pronounced in the curved inlet lines through which powdered solids are blown in suspension into the hydrocarbon conversion or regeneration vessels.

Most, if not all, of the above mentioned disadvantages are overcome in the process of the present invention in which the granular solids are conveyed as a continuous dense compact granular mass through a conduit under the influence of a concurrent flow of conveyance fluid. Solids attrition and conduit erosion are substantially eliminated indicating that particle impacts are primarily responsible in the conventional gas-lift solids conveyance process for the solids attrition and equipment erosion therein. In compact solids conveyance the equipment may be operated under virtually any pressure, contains no moving mechanical parts, and allows the conveyance of greatly increased quantities or rates of granular solids for the same size conveyance conduit. For example, granular catalyst may be conveyed in compact form according to this invention at rates of 500–600 tons per hour in a conduit 16 inches in diameter whereas in the same conduit the maximum practical rate for solids conveyance in suspension in the gas-lift or pneumatic conveyance of solids is about 30–40 tons per hour.

The present invention is specifically directed to an improvement in the compact solids conveyance system wherein the quantity of conveyance fluid employed to convey the granular solids is reduced to an absolute minimum at all points in the multidirectional conveyance conduit thereby resulting in substantial decreases in the energy requirement as well as in the net over-all pressure differential between the inlet and the outlet of the conveyor. The multidirectional conveyance conduits or zones contemplated by this invention are those in which the flow path is nonlinear, that is, the solids are conveyed in one direction for a given distance and then conveyed in different directions successively having greater or lesser slopes relative to a horizontal plane or a vertical axis.

To avoid confusion regarding the slope of the linear parts of the conveyance zone or conduit, the direction of solids flow therein is defined in terms of its angular deviation from a vertical upward reference axis and is designated below as angle $\theta$ in degrees. Thus a vertical flow direction has an angular deviation of zero, a horizontal flow direction has an angular deviation of 90°, etc.

It is a primary object of this invention to provide an improved process for the conveyance of a continuous compact dense mass or stream of granular solids through a multidirectional or nonlinear path by means of a concurrently flowing conveyance fluid.

An additional object of this invention is to provide a compact solids conveyance process in which the solids are passed through an elongated conveyance path having a plurality of individual linear increments of length which have different degrees of angular deviation from a vertical upward reference axis and in which increments the rate of conveyance fluid flow is maintained at a value which is inversely proportional to the angular deviation from the vertical upward reference axis of this particular increment whereby a minimum over-all pressure differential and net energy requirement are obtained.

It is a specific object of this invention to provide a conveyance process for compact solids in which a portion of the conveyance fluid is removed from the multidirectional conveyance zone at the point where the conveyance direction changes to one having a greater angular deviation from the vertical upward reference axis, i. e., one having a lower degree of upward rise or a greater degree of downward slope relative to the horizontal.

It is another specific object of this invention to provide a conveyance process for compact solids in which conveyance fluid is added to the multidirectional conveyance zone at those points where the conveyance direction changes to one having a smaller angular deviation from the vertical upward reference axis, i. e., one having a greater upward rise or a decreased downward slope relative to a horizontal reference.

It is also a specific object of this invention to effect in such a conveyance process the removal of part of the conveyance fluid from the multidirectional conveyance zone at a point at which the flow direction changes to one of greater angular deviation from a vertical upward reference, bypass this fluid to a point further downstream in the conveyance path, and inject at least part of the bypassed fluid back into the conveyance zone at a point at which the conveyance direction changes to one of lesser angular deviation from the vertical upward reference.

It is also an object of this invention to provide an apparatus adapted to effect the aforementioned objects.

Other objects and advantages of the present invention will become apparent to those skilled in the art as the description thereof proceeds.

Briefly, the present invention comprises a process for the conveyance of granular solids in substantially compact form, that is, as a dense granular mass or stream having a bulk density substantially equal to the static bulk density of the solids when at rest and nonaerated, through an elongated multidirectional conveyance zone under the influence of a concurrently flowing stream of conveyance fluid. The dense granular mass of solids within the conveyance zone contains a plurality of interconnected interstices providing a high resistance flow path therethrough for the conveyance fluid. Due to these interconnected interstices the compact dense granular mass of solids, which extends continuously throughout the conveyance zone, constitutes a fluid permeable mass presenting a relatively high resistance flow path to a concurrent flow of conveyance fluid. By the steps of maintaining a relatively high pressure at the inlet of the conveyance zone and/or a relatively low pressure at the outlet of the conveyance zone, supplying a conveyance fluid and a continuous stream of granular solids to be conveyed to the inlet opening of the conveyance zone, and withdrawing fluid and solids from the outlet opening thereof, the conveyance fluid will be induced to flow through the interconnected interstices of the granular mass within the conveyance zone generating throughout the length of the granular mass therein a pressure gradient in the direction of solids flow. By so maintaining this pressure differential between the inlet and the outlet of the conveyance zone at a sufficiently high value, the conveyance fluid is caused to flow therethrough at a sufficiently high rate to generate at every point throughout the granular mass a pressure gradient which is sufficient to overcome opposing forces of gravity and forces of friction exerted by the inner surfaces of the conveyance zone on the granular solids therein. When these forces are overcome, the entire mass of granular solids will move therethrough at a rate determined by the rate of removal from adjacent the outlet of the conduit and may be maintained in motion by continuously supplying granular solids to be conveyed and a stream of conveyance fluid at the inlet of the conveyance zone and continuously removing from the outlet of the conveyance zone a stream of conveyed solids and a stream of conveyance fluid.

Specific steps must be taken to prevent the granular solids during conveyance from fluidizing or being suspended in the concurrent flow of conveyance fluid which generally passes through the conveyance zone at rates and velocities more than adequate to fluidize or suspend the solids if they were permitted to do so. To prevent fluidization or suspension of the granular solids and to maintain them entirely throughout the conveyance zone as a continuous elongated granular mass of compact dense solids having the normal static bulk density, the inlet opening of the conveyance zone is maintained submerged in a dense body of solids to be conveyed and a force is applied against the mass of solids discharging from the outlet opening of the conveyance conduit. The solids flow direction is changed at this point to one which is generally downward and at some point after discharge from the outlet opening a sufficient solids-fluid interfacial area is provided so that the conveyance fluid may be disengaged and separated without the suspension of the granular solids therein.

The force referred to above may be applied by positioning a transverse flat plate termed a thrust plate adjacent and spaced apart from the outlet opening of the conveyance conduit and against which the mass of granular solids discharges and changes direction to one of gravity flow. This force may likewise be applied by positioning a wire mesh or screen in such a transverse position. The mesh or thrust plate may be made movable with respect to the outlet opening. In any case, the solids are withdrawn from the terminal solids-receiving chamber at a rate controlled to maintain the space between the outlet opening of the conveyance conduit and the mesh or thrust plate full of discharging solids. Another means for supplying the thrust force is to surround the outlet opening with a solids-receiving vessel in combination with the step of removing the granular solids from the vessel at a controlled rate so as to establish and maintain a "dead bed" of discharged solids above and around the conveyance zone outlet so that this bed submerges the outlet and in which bed the conveyance fluid velocity is insufficient to overcome the opposing gravitational forces. Another means for applying the force is to change the flow direction to one generally downward into a solids-receiving vessel and maintaining a cone-shaped mass of discharged solids at a level therein such that the apex of the cone-shaped mass coincides with the outlet opening of the conveyance conduit. In all of these specific methods, a force is applied against the discharging mass of granular solids immediately at the outlet opening of the conveyance zone and it is found that this force is reflected entirely throughout the conveyance zone and effectively prevents solids fluidization or suspension and maintains the solids during conveyance substantially at their static bulk density.

It has now been found that the magnitude of the pressure gradient within the conveyance conduit and the corresponding rate of conveyance fluid flow therethrough required to overcome opposing gravitational and friction forces and cause solids flow are strongly affected by the solids flow direction with respect to a vertical upward axis. When compact solids are conveyed upwardly in a vertical direction, the pressure gradient and the conveyance fluid rate necessary to overcome gravity and friction and cause solids motion are the highest. When the flow direction deviates from the vertical and approaches the horizontal, i. e., the angular deviation approaches 90°, successively decreased conveyance fluid flow rates and pressure gradients are sufficient to maintain the solids in motion. The transfer of compact granular solids in a horizontal direction requires a conveyance fluid rate only sufficient to generate a pressure gradient which exceeds the frictional forces of the conveyance zone walls on the granular solids since in this direction the solids are not being conveyed against gravity. The conveyance of compact granular solids downwardly with respect to a horizontal plane, i. e., where the angular deviation exceeds 90°, requires still lower conveyance fluid rates and pressure gradients because of the fact that gravity assists the downward flow. At some particular downward slope relative to a horizontal axis and depending upon the nature of the granular solids and to some extent upon the diameter of the conveyance conduit, the downwardly acting forces of gravity will equal and slightly exceed the frictional forces and the compact granular solids will just flow by themselves in the absence of a conveyance fluid flow and of a pressure gradient induced thereby. The angle of this slope is defined as the solids-to-inner conduit wall angle of repose $\alpha$ and is equal to the angle between a horizontal line and the downwardly sloping axis of the conveyance conduit at which solids flow by gravity alone takes place. The angular deviation in this situation is equal to $90°+\alpha$.

It should be understood that compact granular solids flow will result when conveyance fluid flow rates and the pressure gradients induced thereby exceed the minimum values referred to above. The minimum values are functions of the angular deviation of the conveyance zone flow direction with respect to the vertical upward reference axis and values less than these are not sufficient to convey the solids in compact form at their static bulk density. However, it has been found that in an elongated conveyance zone in which the various increments of length of the conveyance zone have flow directions of different angular deviations from the vertical reference axis, the maximum quantity of granular solids may be conveyed with the minimum over-all pressure differential and with a minimum conveyance fluid requirement only when the flow rate of conveyance fluid in each increment of conveyance zone length is controlled to a specific value which is dependent upon its angular deviation from the vertical.

In the compact solids conveyance system of this invention, the pressure gradient at all points throughout the conveyance zone which must be exceeded in order to establish and maintain the compact solids in motion is correlated by the following relationship:

$$\frac{dp}{dl} = \rho_s \cos \theta + \phi \quad (1)$$

wherein $$\frac{dp}{dl}$$

is the pressure gradient at any point in pounds per square foot per foot of length, $\rho_s$ is the static bulk density of the granular solids being conveyed in pounds per cubic foot, $\theta$ is the angular deviation of the conveyance zone at a particular point with respect to a vertical upward reference axis and $\phi$ is the pressure gradient $$\frac{dp}{dl}$$

equivalent of friction between the solids being conveyed and the inner walls of the conveyance conduit as determined from Equation 1 experimentally for a condition when a minimum value of $$\frac{dp}{dl}$$

will just maintain solids in motion. The value of $\phi$ in the above equation is nearly always equal to between about $0.01\rho_s$ and $1.0\rho_s$, in most cases it lies between about $0.1\rho_s$ and $0.6\rho_s$.

From the foregoing correlation indicating the minimum pressure gradient required for conveyance in a given direction, it can be seen that as the inclination of the conveyance zone is changed from a vertical upward direction to a horizontal direction, the value of $\rho_s \cos \theta$ changes from a value equal to $\rho_s$ to a value equal to 0. The required value of $$\frac{dp}{dl}$$

changes from a maximum value of $\rho_s+\phi$ for a vertical upward direction to a value of $\phi$ for a horizontal direction. It is also apparent that as the direction takes on a downward slope, the value of $\rho_s \cos \theta$ becomes negative and approaches equality with $\phi$ at an angular deviation of $90°+\alpha$ in which case the solids will flow by gravity alone and the required value of pressure gradient $$\frac{dp}{dl}$$

approaches zero for the normal gravity flow rate at that slope. For higher rates, a concurrent fluid flow is required to assist the gravity forces.

The establishment and maintenance of pressure gradients exceeding the minimum values defined above requires a corresponding conveyance fluid flow rate. The higher the required pressure gradient in a given monodirectional increment of the conveyance zone the higher the required conveyance fluid flow rate in that particular increment. Further, the required flow of conveyance fluid is inversely proportional to the degree of angular deviation $\theta$ of the flow direction in a given increment from the vertical upward reference axis. It has been found that the conveyance fluid flow rate necessary to overcome opposing forces of gravity and of solids-conduit wall friction within a given monodirectional increment of the conveyance zone having a given angular deviation is correlated by the following equation:

$$Q = A\left[\frac{\rho_s \cos \theta + \phi}{C\rho_f^{n-1}}\right]^{1/n} \quad (2)$$

wherein Q is the conveyance fluid flow rate in cubic feet per second at existing pressure and temperature conditions, A is the cross-sectional area of the conveyance conduit in square feet, $\rho_s$, $\theta$ and $\phi$ are defined above, $n$ is an exponent having a value of about 1.0 when the conveyance fluid flows in viscous flow and a value of about 1.85 when the conveyance fluid flows in turbulent flow, $\rho_f$ is the density of the conveyance fluid in pounds per cubic foot under the pressure and temperature conditions existing, and C is determined experimentally from passage of the conveyance fluid through a static bed of the granular solids and from the following equation:

$$\frac{dp}{dl} = C\rho_f^{n-1}V_f^n \quad (3)$$

wherein $$\frac{dp}{dl}$$

and $\rho_f$ have been defined above and $V_f$ is the superficial fluid velocity in feet per second through the experimental static bed.

At all points in any given monodirectional increment of the conveyance zone the conveyance flow rate Q should be at least equal to the value indicated in Equation 2 above. At any point along the monodirectional conveyance zone at which the slope is measured by angle $\theta$ changes, a different minimum conveyance fluid flow rate will be required and the amount of conveyance fluid which must be withdrawn or added is given approximately by Equation 4 below:

$$\Delta Q = A_2\left[\frac{\rho_s \cos \theta_2 + \phi_2}{C\rho_f^{n-1}}\right]^{1/n} - A_1\left[\frac{\rho_s \cos \theta_1 + \phi_1}{C\rho_f^{n-1}}\right]^{1/n} \quad (4)$$

wherein subscript 1 refers to the monodirectional increment downstream from the change in slope, $A_1$ being the outlet opening area, and subscript 2 refers to the monodirectional increment upstream from the change in slope, $A_2$ being the outlet opening area and equal to $A_1$. In Equation 4 positive values of $\Delta Q$ indicate the rate at which conveyance fluid is to be withdrawn and negative values of $\Delta Q$ indicate the rate at which supplemental conveyance fluid is to be injected.

Preferably the removal of conveyance fluid is effected at a point just downstream from the point at which the slope changes and the injection of additional fluid is made at a point just upstream from the point at which the slope changes.

In a multidirectional conveyance zone, according to this invention, in which a given monodirectional increment is disposed downstream from an increment having a lower angular deviation $\theta$ and also disposed upstream from another incremental length of conveyance zone having a lower angular deviation $\theta$, at least part of the conveyance fluid withdrawn adjacent the entrance of the given increment may be reinjected adjacent the outlet of the given increment after bypassing that increment. The amounts withdrawn and the amounts reinjected depend upon the angular deviation of the given increment and of the increments immediately upstream and immediately downstream therefrom. The injection or removal of conveyance fluid is effected through a control conduit communicating with the elongated multidirectional conveyance conduit substantially at the points of connection between sections of differing slope or angular deviation from the vertical.

To maintain the highest efficiency with regard to energy requirement and to maintain the minimum over-all pressure differential, the quantity of fluid withdrawn or injected, at those points in the conveyance zone wherein the angular deviation changes, is controlled to maintain the value of pressure gradient only slightly in excess of that required to overcome opposing forces of gravity and friction. The minimum value of pressure gradient is given by Equation 1 defined above and in practical operation the value is maintained in excess of this minimum value. The highest efficiency is maintained when the minimum pressure gradient exists. In nearly all cases the value of pressure gradient is maintained during operation at values less than 100% greater than the values calculated from Equation 1 and preferably maintained at values less than about 25% greater. In a carefully designated conveyance conduit, in which provision is made for conveyance fluid expansion effects as discussed below, it is possible to control the pressure gradient at all points throughout the conveyance zone at values less than about 10% and in many cases at values less than about 5% greater than the value given by Equation 1.

To obtain the greatest conveyance efficiency and minimum energy requirement, it is further preferable that the pressure gradient be substantially constant throughout each particular monodirectional increment of the conveyance zone. The absolute pressure differentials for a given length of line conveying compact solids according to this invention are substantially higher than those characteristic of the conventional pneumatic or gas-lift conveyors in which suspended or fluidized solids are transported. For example, in a 140 foot vertical gas-lift or pneumatic conveyor, a pressure differential of between about 1 and about 3 pounds per square inch would be expected whereas the pressure differential in compact solids conveyance according to this invention is of the order of magnitude of 40 to 80 pounds per square inch depending directly upon the static bulk density of the particular solids being conveyed. Therefore, the conveyance fluid may expand materially during passage through the conveyance zone whereby its density decreases with a corresponding increase in velocity and possibly a transition from viscous to turbulent fluid flow which in turn causes an equivalent increase in the pressure gradient. This may be seen on reference to Equation 3.

The conveyance fluids may be liquids or gases and the expansion effects of the two are substantially different. With liquids, there is no substantial decrease in density upon pressure reduction and correspondingly no substantial increase in the velocity or pressure gradient. With gases, the expansion effect depends upon the relationship that the over-all pressure differential bears to the absolute gas pressure. Ordinarily, when the pressure differential is less than about 10% of the absolute pressure, the conveyance gas expansion can be ignored. However, in many cases this pressure differential exceeds about 10% of the absolute pressure and it is highly desirable to compensate for this gas expansion so as to maintain a relatively constant conveyance fluid velocity and pressure gradient throughout a given conveyance zone increment.

This compensation may be effected in any one of a number of ways. First, the conveyance conduit may be provided with a cross-sectional area which increases in the direction of solids flow so that when the conveyance fluid pressure decreases and the fluid expands, the rate of change of cross-sectional area is sufficient to maintain the velocity of the decreased density gas at a substantially constant value. In this case the conveyance conduit has a relatively uniform taper. Secondly, the conveyance conduit may be fabricated from a series of interconnected sections, each section having a uniform cross-sectional area throughout its length, each successive section having a larger cross-sectional area than the one preceding it. Thirdly, successive portions of the conveyance fluid may be withdrawn along the length of the conveyance conduit in an amount equal to the change in volume due to expansion which occurs upstream therefrom. If desired, a combination of these methods for conveyance fluid expansion compensation may be utilized.

Considering the expansion effects with the foregoing discussion regarding the required pressure gradient in conveyance zone increments having different slopes, it can be seen that the taper required to compensate for the expansion is considerably greater in a conveyance zone increment which rises vertically than that in one having a horizontal direction.

There are other miscellaneous effects which may cause conveyance fluid velocity changes within the conveyance zone including the desorption of fluids from adsorbent solids during transfer which would cause an increase in velocity as well as temperature changes which, depending upon their direction, will cause corresponding velocity changes. As indicated above, these velocity changes are directly reflected in a varying pressure gradient.

In the preferred form of multidirectional conveyance of compact granular solids according to this invention, a substantially constant pressure gradient is maintained throughout the length of each given monodirectional increment of the conveyance zone and also in each such increment a pressure gradient is maintained slightly in excess of that necessary to overcome the counteracting forces of gravity and friction. These conditions are established and maintained by employing different flow rates of conveyance fluid in each monodirectional increment, the magnitude of the flow rate being directly dependent upon the angular deviation $\theta$ with reference to a vertical rising axis according to Equation 2.

The method and apparatus for granular solids conveyance according to this invention will be more clearly understood by reference to the accompanying drawings in which:

Figure 1 indicates schematically a multidirectional compact solids conveyance apparatus in which in the first monodirectional increment the granular solids rise vertically, in the second they are transported horizontally and in the third rise vertically.

In Figure 1a is shown a conveyance system similar to that of Figure 1 but differing in that the second conveyance zone increment slopes upwardly, Figure 1b shows a conveyance system analogous to Figure 1 except that the second increment slopes downwardly, and Figure 2 shows a modified form of apparatus for removing and injecting conveyance fluid adjacent points at which the slope changes.

Referring now more particularly to Figure 1, granular solids to be conveyed are introduced through line 10 into solids pressuring means 12 wherein the fluids present in the interstices of the granular solids are increased in pressure from that existing in line 10 to a relatively high pressure existing in induction zone 14 at the entrance to the multidirectional conveyance system of this invention. A conveyance fluid under pressure is introduced through line 16 controlled by valve 18 into the upper portion of induction zone 14 and at a point above solids level 20 of solids accumulation 22. Induction zone 14 is the highest pressure point in the system and consequently the conveyance fluid passes from induction zone 14 concurrently with and at a rate sufficient to convey the granular solids through redirection portion 24 and then through the first conveyance zone increment 26 into first separator zone 28. The granular solids discharging from the outlet opening 30 of zone 26 pass upwardly beneath and against thrust plate 32 whereby a force is applied against the discharging stream of solids thereby preventing fluidization and maintaining the moving mass of solids within zone 26 at a bulk density substantially equal to the static bulk density of said solids when at rest. The granular solids discharged from outlet opening 30 form solids accumulation 34 having a level 36. The solids interfacial area at solids level 36 is made sufficient, by providing separator zone 28 with a sufficient diameter, so that the conveyance fluid disengaged therefrom and removed from separator zone 28 through line 38 has an insufficient velocity at the interface to suspend granular solids.

The quantity of conveyance fluid flowing through zone 26 must be sufficient to generate a pressure gradient throughout that zone which will overcome the forces of gravity and friction therein. In this modification, the second conveyance zone increment 40 is horizontal, requiring a pressure gradient only sufficient to overcome friction of internal conduit walls on the solids. The difference between the two values of required conveyance fluid rate is equal to the rate at which conveyance fluid is withdrawn from separator 28 through line 38. Of the conveyance fluid discharging into separator 28 with granular solids from first zone 26, a first portion passes concurrently with the granular solids from accumulation 34 horizontally through the second conveyance zone increment 40 into an engaging zone 42 and the remaining portion is removed from the top of separator 28 through line 38 and bypassed therethrough at a rate controlled by control valve 44 in accordance with differential pressure recorder controller instrument 46, and passed through line 48 into engaging zone 42 to join the first portion therein. Instrument 46 actuates control valve 44 in accordance with the differential pressure existing between zones 28 and 42.

The granular solids discharged from conduit 40 form solids accumulation 50 in engaging zone 42 which submerges outlet opening 52 of second zone 40. The weight of the submerging bed of solids in accumulation 50 is sufficient to exert a force against the granular solids discharging from outlet 52 and maintain the solids in conduit 40 in non-fluidized compact form at their static bulk density. Guard plate 54 is disposed within engaging zone 42 to prevent the introduction of granular solids into line 48 during possible upset operating conditions.

The recombined first and second portions of conveyance fluid pass concurrently from granular solids accumulation 50 through redirection or inlet portion 56 and then upwardly through the third conveyance zone increment 58. These granular solids discharge from outlet opening 60 immediately below and against thrust plate 62 within terminal solids-receiving zone 64 forming an accumulation 66 of conveyed granular solids. The operation is analogous to that described in connection with separator zone 28. The upper exposed surface area 68 of solids accumulation 66 may be made sufficiently large so that the combined conveyance fluid stream may be disengaged from the granular solids therethrough without suspending any of the discharged solids. This disengaged stream of conveyance fluid is at least partially removed therefrom through line 70 at a rate controlled by valve 72. The discharged granular solids flow downwardly by gravity from accumulation 66 through transfer line 74 at a rate controlled by means 76. This means may comprise a slide valve or other suitable mechanical valve or it may comprise a granular solids feeding device such as a star feeder and the like. If desired, any remaining portion or all of conveyance fluid may be removed through transfer line 74 concurrently with the discharged solids and subsequently separated.

The granular solids flow rate throughout the entire multidirectional conveyance system is controlled by means 76. In order to maintain the granular solids in compact dense form within the conveyance conduits it is necessary that accumulation of solids 22 in induction zone 14 be maintained so as to submerge the inlet opening of zone 24. When this condition is maintained and a pressure gradient sufficient to convey the solids is established and maintained at all points throughout the conveyance zone increments of the conveyance system and the rate of discharged solids drawoff from separator 64 is controlled and restricted by valve 76 to a value less than the potential solids delivery rate, which is very high, the entire system will remain full of moving granular solids in the form of an elongated continuous compact granular mass.

In the system just described in connection with Figure 1, the conveyance fluid withdrawn from separator 28 at the point where the solids flow direction changes from a vertical upward direction to a horizontal direction, bypasses the horizontal section, and is reinjected into engaging zone 42 at which the solids flow direction generally changes from a horizontal to a vertical upward direction. In the event that the third conveyance zone increment 58 takes a direction other than a vertical upward direction, correspondingly lower pressure gradient and conveyance fluid rate are required. In this modification, the second portion of conveyance fluid removed through line 38 from first separator zone 28 is not all required in combination with the first portion flowing through the second conveyance zone increment 40. Any such excess is therefore withdrawn from line 48 through line 78 at a rate controlled by valve 80. Conversely, if the angular deviation of first zone 26 is greater than that of third zone 58, all the by-passed fluid and additional fluid is injected through line 78 so as to flow through the latter zone.

Any such excess conveyance fluid flow and/or the totally depressured conveyance fluid removed through line 70 may be returned through a fluid pressuring means such as a pump or compressor to the inlet of the conveyance system and reintroduced through line 16 into induction zone 14.

In connection with Figure 1, it should also be noted that first incremental conveyance zone 26 and third incremental conveyance zone 58 are shown as tapered conduits employed to neutralize normal velocity changes accompanying decreases in pressure of a conveyance gas. Second incremental conveyance zone 40, being horizontal and having a considerably lower pressure gradient, is shown nearly cylindrical, although it may be provided with a taper in long runs. In the event that the conveyance fluid is a liquid, all three incremental conveyance zones, 26, 40, and 58 may be cylindrical or otherwise provided with uniform cross-sectional areas.

Referring now more particularly to Figure 1a, the second conveyance zone increment 40a slopes upwardly from first separator zone 28 at an angular deviation $\theta$ which is less than 90°. With such a slope, a greater conveyance fluid flow rate through the conveyance zone is required to cause conveyance of the solids than in the case of horizontal conduits and consequently a smaller second portion of conveyance fluid is withdrawn from separator 28 through line 38 leaving a larger first portion to flow therefrom concurrently with the solids through zone 40a. The withdrawn second portion passes as before through line 38 at a lower rate controlled by valve 44 and then through line 48a into engaging zone 42a. The granular solids discharge from zone 40a thereinto with the first portion of conveyance fluid. Guard plate 54a is provided corresponding to that shown in Figure 1. An accumulation of discharged solids 50a is maintained in separator 42a submerging outlet opening 52a of the conveyance zone and the inlet opening of redirection zone 56a. The combined portions of conveyance fluid flow from separator zone 42a through redirection zone 56a and upwardly concurrently through third conveyance zone increment 58a.

The difference between the process of Figure 1a and that of Figure 1 is only in the slope of zone 40a and in the quantity of conveyance fluid bypassed through lines 38 and 48a between first separator zone 28 and engaging zone 42a. In Figure 1a it should be noted that second conveyance zone increment 40a is a tapered conduit since the pressure gradient therein is considerably higher and the consequential conveyance fluid expansion effects are also higher than in the horizontal modification shown in Figure 1. As in Figure 1, if the third incremental conveyance zone has a greater angular deviation than the first, the combined streams of the first and second portions of conveyance fluid in engaging zone 42a is more than sufficient to convey the solids and will generate an excessively high pressure gradient. Consequently any excess over that necessary to generate the required pressure gradient is withdrawn through line 78a at a rate controlled by valve 80a. Also any deficiency occurring because the third zone has an angular deviation less than that of the first is introduced through line 78a as in Figure 1.

Referring now more particularly to Figure 1b, a modification is shown in which the second conveyance zone increment 40b has a downward slope and a greater angular deviation. In such a modification the forces of gravity acting on the solids assist, rather than impede, the solids movement. Consequently, even less conveyance fluid is necessary in the conveyance zone increment at this attitude than in the modifications shown in Figure 1 and 1a and a greater second portion of conveyance fluid is removed from separator 28 through line 38 and passed through line 48b into engaging zone 42b leaving a smaller first portion (possibly zero) to pass concurrently with the solids through conveyance zone 40b. This smaller first portion need only be sufficient to generate a pressure gradient sufficient to overcome the net impeding force of the conveyance zone friction, that is, the pressure gradient acts in the same direction as a gravitational force in conveyance zone 40b.

When the slope of conveyance zone 40b is at an angle equal to 90° plus α° as defined above, the vector of gravitational force acting in the direction of solids flow exactly balances and equals the opposing force of friction and only a minute amount of concurrent conveyance fluid flow is necessary to cause and maintain solids motion. In this case, practically all of the conveyance fluid is bypassed from first separator zone 28 through lines 38 and 48b into engaging zone 42b. Thus separator zone 28 and engaging zone 42b operate at very nearly the same pressures, 42b being slightly lower.

In a case where the slope of conveyance zone 40b is at an angle greater than 90° plus α° from a vertical axis, the granular solids will flow by gravity alone, all the conveyance fluid is bypassed from first separator zone 28 to engaging zone 42b.

In any of the foregoing modifications, the granular solids discharge from outlet opening 52b in engaging zone 42b, forming solids accumulation 50b therein. The combined streams of conveyance fluid pass from engaging zone 42b through the solids-submerged inlet opening of redirection zone 56b and then pass concurrently with the solids through third conveyance zone increment 58b into final separator zone 64.

The relative amounts of conveyance fluid bypassed from first separator zone 28 to engaging zone 42 is greatest in the modification shown in Figure 1b, is somewhat less in the modification shown in Figure 1 and least in the modification shown in Figure 1a. Where the angular deviation of second conveyance zone increment 40a is decreased so as to approach the vertical, still less quantities of conveyance fluid would be bypassed.

The descriptions of Figures 1, 1a and 1b have involved a conveyance process in which granular solids are transported as a dense compact granular mass through a multidirectional conveyance zone having three monodirectional conveyance zone increments connected in series. It is within the scope of this invention to include multidirectional conveyance zones having a greater or smaller number of monodirectional increments in which the same principles of fluid removal and injection described above are employed. For example, granular solids may be conveyed from induction zone 14 through first conveyance zone increment 26 into first separator zone 28. From this zone a substantial portion of the conveyance fluid is withdrawn through line 38 and the discharged granular solids are passed through the second conveyance zone increment such as 40, 40a or 40b and having a different slope with the remaining portion of conveyance fluid. The solids then are discharged into engaging zone 42, 42a or 42b and the remaining portion of conveyance fluid is separated therefrom and the solids discharged from the bottom of this zone. This modification of conveyance process is one in which the solids are first conveyed through a first conveyance zone increment having a relatively low angular deviation θ and then through a second conveyance zone increment having a somewhat higher angular deviation θ and in which there is a net removal of excess conveyance fluid from a separator zone substantially at the point at which the value of θ changes. Such a modification is exemplified in the accompanying drawings by combinations of first incremental conveyance zone 26 and second incremental conveyance zone 40, 40a, or 40b.

Also within the scope of the present invention is a modification of conveyance process in which granular solids are conveyed through a conveyance zone increment having a relatively high angular deviation θ and then through a succeeding conveyance zone increment having a relatively low angular deviation θ. In this modification, a net addition of conveyance fluid is effected substantially at the point at which the value of θ changes. In the accompanying drawings such modifications are exemplified by combinations of conveyance zone increments 40 or 40a or 40b and 58.

It is also within the scope of this invention to employ the process steps disclosed in conveyance systems having greater than 2 or 3 monodirectional increments.

In the modifications of the process described in Figures 1, 1a, and 1b, the separation of conveyance fluid from the granular solids was effected in an enlarged separation zone into which the granular solids were discharged and the introduction of supplemental conveyance fluid was effected in an enlarged engaging zone into which the granular solids were also discharged. This represents only one modification of separating and injecting conveyance fluids from and into moving masses of compact granular solids. Another modification is illustrated in Figure 2.

Referring now more particularly to Figure 2, granular solids are passed upwardly through a first conveyance zone increment 90, through a curved portion 92 of the conveyance zone and enter a second conveyance zone increment 94 having a higher angular deviation θ, in this case 90°, a horizontal direction. Near the inlet end of the second incremental inlet zone 94 is disposed disengaging chamber 96 surrounding a slotted portion of conveyance zone 94. A plurality of slots 98 are milled or otherwise cut in the wall of the conduit. The width of the slots is preferably less than about one-third the diameter of the smallest solid particle being transferred. The length $d$ of the slotted portion is preferably less than about 100% of the conveyance zone diameter at this point.

Disengaging zone 96 is thus situated downstream from the point at which the conveyance zone angle $\theta$ increases. A portion of the conveyance fluid is withdrawn through slots 98 from the conveyance zone and from disengaging chamber 96. This portion flows through line 100 at a rate controlled by valve 102 in accordance with differential pressure controller 104. The remaining portion of conveyance fluid passes concurrently with the solids through second conveyance zone increment 94.

Adjacent the downsteam end of conveyance zone 94 is supplemental conveyance fluid engaging zone 106 constructed in all respects similar to disengaging zone 96, slots 108 being provided for the introduction of the by-passed portion of conveyance fluid flowing through line 110. The supplemental or by-passed portion of the fluid is thus injected into the moving granular solids at a point upsteam from the point at which the angle $\theta$ decreases. The combined fluid stream flows concurrently with the granular solids from the outlet end of second incremental conveyance zone 94, through curved redirection zone 112 and then through a third incremental conveyance zone 114.

Similar economies of over-all pressure differential and energy requirement obtained in the multidirectional conveyance process of this invention by fluid removal, injection and bypass, may also be realized by providing those conveyance conduit sections having flow directions of larger angular deviations from the vertical upward reference axis with larger cross-sectional areas open to solids and fluid flow. The increased area effects a reduction in fluid velocity and a corresponding reduction in the value of required pressure gradient given by Equation 1. Conversely, on passing solids into a conduit section having a lower angular deviation, a decreased area provides increased fluid velocity and a correspondingly increased pressure gradient necessary, as indicated in Equation 1, to convey the solids more nearly vertically.

In such a modification, no injection or removal of conveyance fluid to or from the multidirectional conveyance conduit at points where angular deviation changes is required if an appropriate inlet area $A_1$ to the downstream section is provided relative to the outlet area $A_2$ of the upsteam section is provided.

The ratio of downstream section inlet area $A_1$ to upstream section outlet area $A_2$ which avoids the injection or removal of conveyance fluid at the point of flow direction change is found to be correlated by the relation:

$$\frac{A_1}{A_2} = \left[\frac{\rho_s \cos \theta_2 + \phi_2}{\rho_s \cos \theta_1 + \phi_1}\right]^{1/n} \quad (5)$$

wherein the factors have been defined above.

Preferably, as described above, each incremental section of the multidirectional conveyance zone is provided with means for maintaining a uniform pressure gradient, such as by providing an increasing area on the direction of flow, in each conduit section. Accordingly, in this modification of the invention, the over-all pressure differential and the fluid requirement and the energy requirement are minimized and the injection or removal of fluid is avoided by providing in the multidirectional conveyance system of this invention a plurality of serially connected incremental conveyance zones or conduit sections, each having an increasing cross-sectional area in the direction of flow to maintain a substantially constant pressure gradient therein and by providing conduit sections which have inlet and outlet opening areas which bear the relationship given in Equation 5 to the areas of the outlet and inlet openings of communicating conduit sections with which they connect.

The following data are given as illustrations of the conveyance method and apparatus of this invention whereby the reduction in conveyance fluid, energy and inlet pressure are apparent. These data are given in connection with the conveyance of bead cracking catalyst weighing 55.6 pounds per cubic foot at a rate of 100 tons per hour with air at 70° F. as the conveyance fluid and discharging from the outlet of the conveyor at 5 pounds per square inch gauge. In Examples I and II the multidirectional conveyor rises vertically for 50 feet, then travels horizontally for 100 feet and then rises 50 feet vertically to the discharge point. In Example I, no fluid withdrawal or by-passing was employed in connection with the horizontal section whereas in Example II by-passing of fluid according to this invention was employed.

*Example I*

The first 50 foot vertical section tapered from 7.98 inches to 10.6 inches inside diameter (I. D.), the horizontal 100 foot section tapered from 10.6 inches to 16.8 inches I. D. and the second 50 foot vertical section tapered from 16.8 inches to 22.4 inches I. D. The taper maintained a constant pressure gradient in each section. At 100 tons per hour conveyance rate, the required inlet air pressure was 86.2 pounds per square inch gauge, the air rate entering the line was 679 S. C. F. M. (standard cubic feet per minute) and the power requirement in a two-stage air compressor was 210 (efficiency approximately 75%). No air was by-passed around the horizontal section.

*Example II*

The conveyor of Example I was modified to provide for by-pass of air around the horizontal section. The taper was modified because of the change in operating pressure of air rate to maintain constant pressure gradients in each section and the taper was from 7.98 inches to 11.35 inches to 14.30 inches to 19.60 inches. At 100 tons per hour conveyance rate, the required inlet pressure was 55.0 pounds per square inch gauge, the air rate entering the line was 492 S. C. F. M. of which 135 S. C. F. M. was by-passed around the horizontal section and the power requirement in the same compressor was 123.

Reductions of 41.4% in power requirement and 27.5% in air requirement were achieved. The weight of the conveyance conduit was also reduced by virtue of the reduced diameters. These are very substantial improvements and result from the control of pressure gradient maintained within a given section of conveyance conduit as a function of the angular deviation of the solids flow direction whereby maximum operating efficiency is realized.

In the present specification the term "substantially compact unfluidized form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% [1]) and the greatest bulk density (about 41.5% greater) when uniformly packed with particle centers coinciding with the apexes of a tetrahedron (rhombohedral packing—pore volume 25.95% [1]). The bulk density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
| Inlet | 3.068 |
| Outlet | 4.000 |
| Conveyance fluid | Air |
| Solids mesh size | 4–10 |
| Solids flow rate, lb./hr. | 4,500 |
| Solids vibrational bulk density lb./cu. ft. | 46.7 |

Upon depressuring the conveyance fluid from the bottom of the conduit while preventing further introduction of solids thereinto, it was noted that the solids level dropped only 0.25 feet from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase their size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating

[1] Micromeritics—J. M. Dalla Valle (1943) p. 105.

bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for the conveyance of granular solids, as a continuous compact mass having a bulk density substantially equal to the static bulk density of the solids when at rest, from an induction zone through an elongated multidirectional conveyance zone having at least two incremental zone portions of differing degrees of angular deviation from a vertical upward reference axis and into a terminal solids-receiving zone which comprises passing solids into said induction zone to form and maintain a compact accumulation of solids therein submerging the inlet opening of said elongated conveyance zone communicating therewith, introducing a conveyance fluid under pressure relative to that in said terminal solids-receiving zone into said induction zone whereby a flow of said conveyance fluid through said conveyance zone is established and maintained at a rate sufficient to overcome forces of gravity and friction opposing solids movement and thereby establish and maintain movement of said solids through said conveyance zone concurrently with said flow of conveyance fluid, controlling the rate of withdrawal of conveyed solids from said solids-receiving zone to maintain the outlet opening of said conveyance conduit therein submerged in a compact mass of discharged solids whereby a force is applied against said solids discharging from said outlet to maintain said solids during conveyance through said conveyance zone in the form of a continuous compact moving granular mass of solids substantially at their static bulk density, removing conveyance fluid from said solids-receiving zone, and controlling the velocity and rate of flow of said conveyance fluid through each incremental zone portion of said conveyance zone at a value inversely proportional to the degree of angular deviation of said portion from said vertical reference axis and sufficient to overcome opposing forces of gravity and friction acting on said solids therein whereby the pressure differential between said induction zone and said separator zones and the power required to effect solids conveyance are substantially reduced.

2. A method according to claim 1 wherein said multidirectional conveyance zone includes an upstream incremental zone portion having a relatively low degree of angular deviation from said vertical upward reference axis and communicating at its outlet opening with the inlet opening of a downstream incremental zone portion having a relatively higher degree of angular deviation and wherein the step of controlling the rate of conveyance fluid flow in said downstream incremental portion comprises the step of removing a portion of said conveyance fluid substantially at the point of communication of said downstream and upstream incremental portions whereby the velocity and flow rate of conveyance fluid in said downstream portion is less than that in said upstream portion.

3. A method according to claim 1 wherein said multidirectional conveyance zone includes an upstream incremental zone portion having a relatively high degree of angular deviation from said vertical upward reference axis and communicating at its outlet opening with the inlet opening of a downstream incremental zone portion having a relatively lower degree of angular deviation and wherein the step of controlling the rate of conveyance fluid flow in said downstream incremental zone portion comprises the step of injecting additional conveyance fluid substantially at the point of communication of said downstream and upstream incremental zone portions whereby the flow rate of conveyance fluid in said downstream zone portion is greater than that in said upstream zone portion.

4. A method according to claim 1 wherein said multidirectional conveyance zone includes a first pair of successive incremental conveyance zone portions, wherein the first upstream portion has a relatively low degree of angular deviation from said vertical upward reference axis and communicates at its outlet with the inlet of a first downstream portion having a relatively higher degree of angular deviation, and a second pair of successive incremental conveyance zone portions downstream from said first pair and wherein a second upstream portion has a relatively high degree of angular deviation and communicates at its outlet with the inlet of a second downstream portion having a relatively lower degree of angular deviation and wherein the step of controlling the rate of flow of said conveyance fluid comprises in combination the steps of removing a portion of said conveyance fluid substantially at the point of communication of said first pair of successive incremental conveyance zone portions whereby the fluid flow rate through said first downstream portion is less than that in said first upstream portion and injecting additional conveyance fluid into said multidirectional conveyance zone substantially at the point of communication of said second pair of successive incremental conveyance zone portions whereby the fluid flow rate in said second downstream portion is greater than that in said second upstream portion.

5. A method according to claim 4 wherein at least part of said fluid removed substantially at the point of communication of said first pair of incremental portions is injected substantially at the point of communication of said second pair of incremental portions downstream from said first pair.

6. A method for the conveyance of granular solids as a dense compact continuous mass having a bulk density substantially equal to the static bulk density of the solids when at rest from an induction zone through an elongated multidirectional conveyance zone including in the direction of flow successively a first incremental conveyance zone portion having a relatively low degree of angular deviation from a vertical upward reference axis and a second incremental portion having a relatively high degree of angular deviation and a third incremental portion having a relatively low degree of angular deviation and then into a terminal solids-receiving zone which comprises passing solids into said induction zone to form and maintain a compact accumulation of solids therein submerging the inlet opening of said elongated conveyance zone communicating therewith, introducing a conveyance fluid under pressure relative to that in said separator zone into said induction zone whereby a flow of said conveyance fluid through said conveyance zone is established and maintained at a rate sufficient to overcome forces of gravity and friction opposing solids movement and thereby establish and maintain movement of said solids through said conveyance zone concurrently with said flow of conveyance fluid, controlling the rate of withdrawal of conveyed solids from said terminal solids-receiving zone to maintain the outlet opening of said conveyance conduit therein submerged in a compact mass of discharged solids whereby a force is applied against said solids discharging from said outlet to maintain said solids during conveyance through said conveyance zone in the form of a continuous compact moving granular mass of solids substantially at the solids' static bulk density, removing conveyance fluid from said solids-receiving zone, removing a portion of said conveyance fluid substantially at the point of communication of said first and second incremental portions, injecting at least a portion of the thus withdrawn fluid back into said conveyance zone substantially at the point of communication of said second and third incremental portions whereby conveyance fluid by-passes said second incremental portion in passing between said first and third incremental portions, and controlling the rates of fluid removal and injection to maintain a conveyance fluid flow within said second and third incremental portions at values inversely proportional to the degree of angular deviation of said portion from said vertical reference axis and sufficient to overcome opposing forces of gravity and friction acting on said solids therein whereby the pressure differential between said induction zone and said solids-receiving zones and the power required to effect solids conveyance are substantially reduced.

7. A method according to claim 6 in combination with the step of controlling the flow rate of the conveyance fluid by-passing said second incremental portion to maintain a predetermined pressure differential between the inlet and outlet of said second incremental portion.

8. A method for the conveyance of granular solids, as a continuous compact mass having a bulk density substantially equal to the static bulk density of the solids when at rest, from an induction zone through an elongated multidirectional conveyance zone having at least two incremental portions of differing degrees of angular deviation from a vertical upward reference axis and into a terminal solids-receiving zone which comprises passing solids into said induction zone to form and maintain a compact accumulation of solids therein submerging the inlet opening of said elongated conveyance zone communicating therewith, introducing a conveyance fluid under pressure relative to that in said separator zone into said induction zone whereby a flow of said conveyance fluid through said conveyance zone is established and maintained at a rate sufficient to overcome forces of gravity and friction opposing solids movement and thereby establish and maintain movement of said solids through said conveyance zone concurrently with said flow of conveyance fluid, controlling the rate of withdrawal of conveyed solids from said solids-receiving zone to maintain the outlet opening of said conveyance zone therein submerged in a compact mass of discharged solids whereby a force is applied against said solids discharging from said outlet to maintain said solids during conveyance through said conveyance zone in the form of a continuous compact moving granular mass of solids substantially at the solids' static bulk density, removing conveyance fluid from said solids-receiving zone, and controlling the rate of flow of said conveyance fluid through each incremental portion of said conveyance zone at a value inversely proportional to the degree of angular deviation of said portion from said vertical reference axis and sufficient to overcome opposing forces of gravity and friction acting on said solids therein and approximately equal to Q standard cubic feet per second in the relationship:

$$Q = A \left[ \frac{\rho_s \cos \theta + \phi}{C \rho_f^{n-1}} \right]^{1/n}$$

wherein A is the cross-sectional area of the conveyance zone incremental portion in square feet, $\rho_s$ is the static bulk density of the dense compact solids in pounds per cubic foot, $\theta$ is the angular deviation of the direction of solids flow through said incremental portion in degrees from a vertical upward reference axis, $\phi$ is the pressure gradient equivalent of solids-conveyance zone surface friction in pounds per square foot per foot, $\rho_f$ is the conveyance fluid density in pounds per cubic foot, n is an exponent equal to a value of 1.0 for viscous fluid flow and 1.85 for turbulent flow, and C is determined experimentally from passing conveyance fluid through a bed of solids and from the relation:

$$\frac{dp}{dl} = C \rho_f^{n-1} V_f^n$$

wherein $dp/dl$ is a pressure gradient in pounds per square foot per foot, and $V_f$ is the superficial fluid velocity of fluid flow in feet per second through said bed of solids, and whereby the pressure differential between said induction zone and said solids-receiving zones and the power required to effect solids conveyance are substantially reduced.

9. A method according to claim 8 wherein said multidirectional conveyance zone includes an upstream incremental portion having a relative low degree of angular deviation from said vertical upward reference axis and communicating at its outlet opening with the inlet opening of a downstream incremental portion having a relatively higher degree of angular deviation and wherein the step of controlling the rate of conveyance fluid flow in said downstream incremental portion comprises the step of removing a portion of said conveyance fluid substantially at the point of communication of said downstream and upstream incremental portions at a rate $\Delta Q$ in cubic feet per second approximately given by the relationship:

$$\Delta Q = A_2 \left[ \frac{\rho_s \cos \theta_2 + \phi_2}{C \rho_f^{n-1}} \right]^{1/n} - A_1 \left[ \frac{\rho_s \cos \theta_1 + \phi_1}{C \rho_f^{n-1}} \right]^{1/n}$$

wherein subscript 1 refers to said upstream incremental portion and subscript 2 refers to said downstream incremental portion and wherein $A_2$ is equal to $A_1$.

10. A method according to claim 8 wherein said multidirectional conveyance zone includes an upstream incremental portion having a relatively high degree of angular deviation from said vertical upward reference axis and communicating at its outlet opening with the inlet opening of a downstream incremental portion having a relatively lower degree of angular deviation and wherein the step of controlling the rate of conveyance fluid flow in said downstream incremental portion comprises the step of injecting additional conveyance fluid substantially at the point of communication of said downstream and upstream incremental portions at a rate $\Delta Q$ in cubic feet per second approximately given by the relationship:

$$\Delta Q = A_2 \left[ \frac{\rho_s \cos \theta_2 + \phi_2}{C \rho_f^{n-1}} \right]^{1/n} - A_1 \left[ \frac{\rho_s \cos \theta_1 + \phi_1}{C \rho_f^{n-1}} \right]^{1/n}$$

wherein subscript 1 refers to said upstream incremental portion and subscript 2 refers to said downstream incremental portion, the rate of fluid injection $\Delta Q$ being a negative number and wherein $A_2$ is equal to $A_1$.

11. An apparatus for the conveyance of granular solids which comprises in combination an induction chamber, a terminal solids-receiving chamber and an elongated conveyance conduit communicating at its inlet opening with the lower portion of said induction chamber and at its outlet opening with said solids-receiving chamber, said conveyance conduit including at least two serially connected linear conduit sections, the longitudinal flow direction axes of which have differing degrees of angular deviation from a vertical upward reference axis, means for introducing solids to be conveyed under pressure into said induction vessel, means for introducing a conveyance fluid under pressure into said induction chamber, means for maintaining the pressure of said induction chamber at a value greater than that in said solids-receiving chamber to establish and maintain a conveyance fluid flow through said conveyance conduit at a rate sufficient to overcome opposing forces of gravity and friction and move said solids therethrough, means for applying a force against solids discharging therefrom into said solids-receiving chamber to maintain solids in said conveyance conduit as a continuous dense mass of compact solids having a bulk density substantially equal to the static bulk density of said solids when at rest, a control conduit for conveyance fluid communicating with said elongated conveyance conduit substantially at the point of communication of said two serially connected linear conduit sections, and means for controlling the rate of conveyance fluid flow through said control conduit to maintain the conveyance fluid flow rate through the conduit section downstream from said point of communication at a value inversely proportional to the degree of angular deviation of its flow direction axis from said vertical upward reference axis and sufficient to maintain solids motion therethrough.

12. An apparatus according to claim 11 wherein said elongated conveyance conduit includes an upstream conduit section, which has a relatively low degree of angular deviation from said vertical reference axis, opening at its outlet substantially at said point of communication into the inlet of a downstream conduit section which has a relatively high degree of angular deviation from said vertical reference axis, and wherein said control conduit is for the removal of conveyance fluid from said conveyance conduit.

13. An apparatus according to claim 11 wherein said elongated conveyance conduit includes an upstream conduit section, which has a relatively high degree of angular deviation from said vertical reference axis, opening at its outlet substantially at said point of communication into the inlet of a downstream conduit section, which has a relatively low degree of angular deviation from said vertical reference axis, and wherein said control conduit is for the injection of conveyance fluid into said conveyance conduit.

14. An apparatus according to claim 11 wherein said elongated conveyance conduit includes a plurality of said serially communicating linear conduit sections wherein a first communicating pair includes a first downstream section of relatively low angular deviation communicating with a first upstream section of higher angular deviation and a second communicating pair, downstream from said first pair, includes a second upstream section of relatively high angular deviation communicating with a second downstream section of lower angular deviation at a point downstream from the point of communication of said first pair of conduit sections, in combination with a first control conduit opening from said conveyance conduit substantially at the point of communication of said first pair of conduit sections and a second control conduit opening into said conveyance conduit substantially at the point of communication of said second pair of conduit sections.

15. An apparatus according to claim 14 in combination with a by-pass conduit communicating said first control conduit with said second control conduit whereby fluid removed at said first communication point is at least partly injected at said second communication point.

16. An apparatus according to claim 11 in combination with a separator chamber disposed substantially at said point of communication and in solids-receiving relation to said upstream conduit section, said downstream conduit section opening from the lower part of said separator chamber, said control conduit communicating therewith at the upper part thereof.

17. An apparatus according to claim 11 wherein said conduit section is provided lateral openings smaller in size than said solids in combination with a fluid tight chamber surrounding said lateral openings, said control conduit communicating with said chamber.

18. An apparatus according to claim 17 wherein said lateral openings and said chamber surrounding said openings are disposed adjacent and upstream from the point of communication of an upstream conduit section having a relatively high degree of angular deviation and a downstream conduit section having a lower degree of angular deviation.

19. An apparatus according to claim 17 wherein said lateral openings and said chamber surrounding said openings are disposed adjacent and downstream from the point of communication of an upstream conduit section having a relatively low degree of angular deviation and a downstream conduit section having a higher degree of angular deviation.

20. An apparatus for the conveyance of granular solids which comprises in combination an induction chamber, a terminal solids-receiving chamber and an elongated conveyance conduit communicating at its inlet opening with the lower portion of said induction chamber and at its outlet opening with said solids-receiving chamber, said conveyance conduit including at least two serially connected linear conveyance conduit sections which have flow direction axes of differing degrees of angular deviation from a vertical upward reference axis, means for introducing solids to be conveyed under pressure into said induction vessel, means for introducing a conveyance fluid under pressure into said induction chamber, means for maintaining the pressure of said induction chamber at a value greater than that in said solids-receiving chamber to establish and maintain a conveyance fluid flow through said conveyance conduit at a rate sufficient to overcome opposing forces of gravity and friction and move said solids therethrough, means for applying a force against solids discharging therefrom into said solids-receiving chamber to maintain solids in said conveyance conduit as a continuous dense mass of compact solids having a bulk density substantially equal to the static bulk density of said solids when at rest, the ratio between the cross-sectional area of the inlet opening $A_1$ of a downstream conduit section and the outlet opening $A_2$ of the communicating upstream conduit section being substantially equal to:

$$\frac{A_1}{A_2} = \left[\frac{\rho_s \cos \theta_2 + \phi_2}{\rho_s \cos \theta_1 + \phi_1}\right]^{1/n}$$

wherein subscript 1 refers to the downstream conduit section, subscript 2 refers to the upstream conduit section, A is the cross-sectional area of the conveyance zone incremental portion in square feet, $\rho_s$ is the static bulk density of the dense compact solids in pounds per cubic foot, $\theta$ is the angular deviation of the direction of solids flow through said incremental portion in degrees from a vertical upward reference axis, $\phi$ is the pressure gradient equivalent of solids-conveyance zone surface friction in pounds per square foot per foot, $\rho_f$ is the conveyance fluid density in pounds per cubic foot and $n$ is an exponent equal to a value of 1.0 for viscous fluid flow and 1.85 for turbulent flow, whereby the pressure differential between said induction and solids-receiving chambers and the power required to effect solids conveyance are substantially reduced.

References Cited in the file of this patent

UNITED STATES PATENTS

| | | |
|---|---|---|
| 727,030 | Tilghman | May 5, 1903 |
| 1,991,403 | McManamna | Feb. 19, 1935 |
| 2,304,827 | Jewell | Dec. 15, 1942 |
| 2,509,983 | Morrow | May 30, 1950 |

FOREIGN PATENTS

| | | |
|---|---|---|
| 180,397 | Great Britain | May 11, 1922 |
| 268,667 | Great Britain | Apr. 7, 1927 |